(12) United States Patent
Varjos et al.

(10) Patent No.: US 10,996,808 B2
(45) Date of Patent: May 4, 2021

(54) METHOD FOR PRODUCING A LAMINATED FILM

(71) Applicant: Canatu Oy, Helsinki (FI)

(72) Inventors: Ilkka Varjos, Espoo (FI); Liam O'Suillebhain, Helsinki (FI); Dewei Tian, Kerava (FI); Elisa Koponen, Helsinki (FI)

(73) Assignee: CANATU OY, Vantaa (FI)

( * ) Notice: Subject to any disclaimer, the term of this patent is extended or adjusted under 35 U.S.C. 154(b) by 0 days.

(21) Appl. No.: 16/307,071

(22) PCT Filed: Apr. 19, 2018

(86) PCT No.: PCT/FI2018/050278
§ 371 (c)(1),
(2) Date: Dec. 4, 2018

(87) PCT Pub. No.: WO2018/197746
PCT Pub. Date: Nov. 1, 2018

(65) Prior Publication Data
US 2019/0270293 A1 Sep. 5, 2019

(30) Foreign Application Priority Data
Apr. 25, 2017 (FI) .................................. 20175373

(51) Int. Cl.
*G06F 3/045* (2006.01)
*B32B 7/027* (2019.01)
*B32B 7/04* (2019.01)
*B32B 37/10* (2006.01)
*B32B 37/26* (2006.01)

(52) U.S. Cl.
CPC .............. *G06F 3/045* (2013.01); *B32B 7/027* (2019.01); *B32B 7/04* (2013.01); *B32B 37/10* (2013.01); *B32B 37/26* (2013.01); *B32B 2255/10* (2013.01); *B32B 2255/20* (2013.01); *B32B 2305/342* (2013.01); *B32B 2307/202* (2013.01);
(Continued)

(58) Field of Classification Search
CPC .............................. G06F 3/0488; G06F 3/045
See application file for complete search history.

(56) References Cited

U.S. PATENT DOCUMENTS

| 6,507,337 B1 | 1/2003 | Sato et al. |
| 2003/0071794 A1 | 4/2003 | Arakawa |

(Continued)

FOREIGN PATENT DOCUMENTS

| EP | 1850216 A2 | 10/2007 |
| EP | 2450467 A1 | 5/2012 |

(Continued)

OTHER PUBLICATIONS

English language Abstract of corresponding published Application No. JP2017095331.

(Continued)

*Primary Examiner* — Christopher T Schatz
(74) *Attorney, Agent, or Firm* — Ware, Fressola, Maguire & Barber LLP (57) ABSTRACT

The present application relates to a method for producing a laminated film. The present application further relates to a laminated film and to the uses thereof. The present invention further relates to a touch sensitive film.

19 Claims, 1 Drawing Sheet

(52) U.S. Cl.
 CPC ... *B32B 2307/412* (2013.01); *B32B 2307/538* (2013.01)

(56) References Cited

U.S. PATENT DOCUMENTS

| | | | |
|---|---|---|---|
| 2004/0265602 A1* | 12/2004 | Kobayashi | B32B 7/02 |
| | | | 428/458 |
| 2010/0247810 A1 | 9/2010 | Yukinobu | |
| 2012/0229423 A1 | 9/2012 | Takamiya et al. | |
| 2013/0169593 A1* | 7/2013 | Imamura | G06F 3/0412 |
| | | | 345/174 |
| 2015/0261264 A1* | 9/2015 | Brown | G06F 3/0221 |
| | | | 345/174 |

FOREIGN PATENT DOCUMENTS

| | | | |
|---|---|---|---|
| JP | 11306867 A | 11/1999 | |
| JP | 20100238455 A | 1/2010 | |
| JP | 2014191806 A | 10/2014 | |
| JP | 2015232069 A | 6/2017 | |
| WO | 2007057501 A1 | 5/2007 | |
| WO | 2016051247 A1 | 4/2016 | |

OTHER PUBLICATIONS

Niasibulin, A., et al., Multifunctional Free-Standing Single-Walled Carbon Nanotube Films, American Chemical Society, 2011, pp. 3214-3221.
English language Abstract and translation of JP2014191806A.
English language Abstract and translation of JP2010238445A.
English language Abstract and translation of JPH11306887A.
English language Abstract of JPWO2016051247(A1).

* cited by examiner

METHOD FOR PRODUCING A LAMINATED FILM

TECHNICAL FIELD

The present application relates to a method for producing a laminated film. Further, the present application relates to a laminated film and to uses thereof, and to a touch sensitive film.

BACKGROUND

Lamination is a technique of manufacturing a material in multiple layers, so that the composite material achieves e.g. improved strength, stability, appearance or other properties from the use of differing materials. A laminated film can be considered a permanently assembled object. There are different lamination processes, depending on the type of materials to be laminated. The materials used in laminates can be the same or different, depending on the processes and the object to be laminated. Lamination is usually carried out by the use of heat, pressure, welding, and/or adhesives. Despite the existing lamination processes, the inventors have recognized a need for a method to produce a laminated film.

PURPOSE

The purpose is to provide a new type of method for producing a laminated film. Further, the purpose is to provide a laminated film and uses thereof. Further, the purpose is to provide a touch sensitive film.

SUMMARY

The method is characterized by what is presented in claim 1.

The laminated film is characterized by what is presented in claim 20.

The touch sensitive film is characterized by what is presented in claim 22.

The use is characterized by what is presented in claim 23.

BRIEF DESCRIPTION OF THE DRAWINGS

The accompanying drawings, which are included to provide a further understanding of the method and the laminated film and constitute a part of this specification, illustrate embodiments and together with the description help to explain the principles of the above. In the drawings.

DETAILED DESCRIPTION

The present application relates to a method for producing a laminated film, wherein the method comprises providing at least one structure comprising a transparent layer comprising transparent conductor material on a first non-conductive transparent base film, wherein the structure has a first outer surface and a second outer surface, which is opposite to the first outer surface;

providing a second non-conductive transparent base film having a first main surface and a second main surface, which is opposite to the first main surface;

arranging the at least one structure and the second non-conductive transparent base film one on the other to form a layered film preform, wherein at least the one of the first main surface and the second main surface that faces the at least one structure is provided with a surface roughness of 1.1-20 µm as measured according to ISO 4287/1997, and wherein at least the one of the first outer surface and the second outer surface that faces the second non-conductive transparent base film is provided with a surface roughness of above 0-1.0 µm as measured according to ISO 4287/1997; and applying heat and pressure on the layered film preform for a predetermined period of time for bonding together the at least one structure and the second non-conductive transparent base film.

The present application relates to a method for producing a laminated transparent film, wherein the method comprises providing at least one structure comprising a transparent layer comprising transparent conductor material on a first non-conductive transparent base film, wherein the structure has a first outer surface and a second outer surface, which is opposite to the first outer surface;

providing a second non-conductive transparent base film having a first main surface and a second main surface, which is opposite to the first main surface;

arranging the at least one structure and the second non-conductive transparent base film one on the other to form a layered film preform, wherein at least the one of the first main surface and the second main surface that faces the at least one structure is provided with a surface roughness of 1.1-20 µm as measured according to ISO 4287/1997, and wherein at least the one of the first outer surface and the second outer surface that faces the second non-conductive transparent base film is provided with a surface roughness of above 0-1.0 µm as measured according to ISO 4287/1997; and applying heat and pressure on the layered film preform for a predetermined period of time for bonding together the at least one structure and the second non-conductive transparent base film.

The present application further relates to a laminated film obtainable by the method as described in this specification.

The present application further relates to a laminated transparent film obtainable by the method as described in this specification.

The present application further relates to a touch sensitive film comprising the laminated transparent film as described in this specification.

The present application further relates to a method for producing a touch sensitive film, wherein the method comprises providing at least one structure comprising a transparent layer comprising transparent conductor material on a first non-conductive transparent base film, wherein the structure has a first outer surface and a second outer surface, which is opposite to the first outer surface;

providing a second non-conductive transparent base film having a first main surface and a second main surface, which is opposite to the first main surface;

arranging the at least one structure and the second non-conductive transparent base film one on the other to form a layered film preform, wherein at least the one of the first main surface and the second main surface that faces the at least one structure is provided with a surface roughness of 1.1-20 µm as measured according to ISO 4287/1997, and wherein at least the one of the first outer surface and the second outer surface that faces the second non-conductive transparent base film is provided with a surface roughness of above 0-1.0 µm as measured according to ISO 4287/1997; and applying heat and pressure on the layered film preform for a predetermined period of time for bonding together the at least one structure and the second non-conductive transparent base film.

The present application further relates to the use of the laminated film in a touch sensing device, a photovoltaic system, in heating applications, in a current conductor, or in a lighting system.

The present application further relates to the use of the laminated transparent film in a touch sensing device, a photovoltaic system, in heating applications, in a current conductor, or in a lighting system.

The produced laminated film may be attached to one or more objects depending on its further use. In one embodiment, the laminated film is implemented as a window. In one embodiment, the laminated film is implemented as a display.

In this specification, unless otherwise indicated, the surface roughness should be understood as referring to the "Rz" parameter (mean roughness depth) of the standard ISO 4287/1997. ISO 4287/1997 defines "Rz" as the sum of the height of the largest profile peak height Zp and the largest profile valley depth Zv within a sampling length.

The expression that the transparent layer comprising transparent conductor material is provided "on" the first non-conductive transparent base film should be understood in this specification, unless otherwise stated, as meaning that the transparent layer comprising transparent conductor material is provided or formed to lie on or upon the first non-conductive transparent base film or is being at least partly embedded therein. The non-conductive transparent base film may serve as a carrier or support structure for the transparent layer comprising transparent conductor material.

The term "comprising" is used in this specification to mean including the feature(s) or act(s) followed thereafter, without excluding the presence of one or more additional features or acts.

It will further be understood that reference to "an" item refers to one or more of those items.

The expression "film" should be understood in this specification, unless otherwise stated, as referring to a structure having its lateral dimensions substantially larger than its thickness. In that sense, a film may be considered as being a "thin" structure.

In one embodiment, the thickness of the laminated film is 0.5 nm-1000 nm. In one embodiment, the thickness of the laminated film is 0.1 µm-5 mm.

The expression that the transparent base film is "non-conductive" should be understood in this specification, unless otherwise stated, as meaning that the transparent base film has a sheet resistance of 10 Mohms/square or higher.

The expression "transparent" should be understood in this specification, unless otherwise stated, as referring to optical transparency of the laminated film or the parts and materials thereof in the relevant wavelength range at issue. In other words, "transparent" material or structure refers to a material or structure allowing light, or generally electromagnetic radiation, at such relevant wavelength to propagate through such material or structure. The relevant wavelength range may depend on the application where the laminated transparent film is to be used. In one embodiment, the relevant wavelength range is the visible wavelength range of about 390 to about 700 nm.

In one embodiment, the method comprises producing a laminated transparent film. In one embodiment, the laminated film is a laminated transparent film.

In one embodiment, the transparent layer comprising transparent conductor material is a transparent conductive layer comprising transparent conductor material.

Further, the transparency of the laminated film or the parts thereof primarily refers to the transparency in the thickness direction of the laminated film or the parts thereof so that in order to be "transparent", sufficient portion of light energy incident on the laminated film or a part thereof shall propagate through it in the thickness direction. Such sufficient portion may depend on the application in which the laminated film is to be used. In one embodiment, the transmittance of the laminated film or the parts thereof is 20-99.99% of the energy of light incident perpendicularly on the laminated film, at a location where the transparent conductor material is present. In one embodiment, said transmittance is 20% or higher, or 30% or higher, or 40% or higher, or 50% or higher, or 60% or higher, or 70% or higher, or 80% or higher, 90% or higher. The transmittance may be measured according to standard JIS-K7361, ASTM D1003.

In one embodiment, at least the one of the first main surface and the second main surface that faces the at least one structure is provided with a surface roughness of 2-17 µm, or 5-17 µm, or 11-17 µm, or 9-15 µm, or 10-14 µm, as measured according to ISO 4287/1997.

In one embodiment, at least the one of the first main surface and the second main surface that faces the at least one structure is provided with a surface roughness of 1.1-9 µm, or 2-9 µm, or 5-9 µm, or 2-7 µm, or 2-5 µm, or 3-5 µm as measured according to ISO 4287/1997.

In one embodiment, both the first main surface and the second main surface are provided with a surface roughness of 1.1-20 µm, or 2-17 µm, or 5-17 µm, or 11-17 µm, or 9-15 µm, or 10-14 µm, as measured according to ISO 4287/1997.

In one embodiment, both the first main surface and the second main surface are provided with a surface roughness of 1.1-9 µm, or 2-9 µm, or 5-9 µm, or 2-7 µm, or 2-5 µm, or 3-5 µm as measured according to ISO 4287/1997.

In one embodiment, each surface of a second non-conductive transparent base film facing the structure is provided with a surface roughness of 1.1-20 µm, or 2-17 µm as measured according to ISO 4287/1997. In one embodiment, each surface of a second non-conductive transparent base film facing the structure is provided with a surface roughness of 5-17 µm, or 11-17 µm, or 9-15 µm, or 10-14 µm, as measured according to ISO 4287/1997. In one embodiment, each surface of a second non-conductive transparent base film facing the structure is provided with a surface roughness of 1.1-9 µm, or 2-9 µm, or 5-9 µm, or 2-7 µm, or 2-5 µm, or 3-5 µm as measured according to ISO 4287/1997.

In one embodiment, the first main surface and the second main surface have the same surface roughness. In one embodiment, the first main surface and the second main surface have different surface roughnesses.

In one embodiment, at least the one of the first outer surface and the second outer surface that faces the second non-conductive transparent base film is provided with a surface roughness of 0.01-1.0 µm, or 0.1-1.0 µm, as measured according to ISO 4287/1997. In one embodiment, at least the one of the first outer surface and the second outer surface that faces the second non-conductive transparent base film is provided with a surface roughness of above 0-0.5 µm, or 0.01-0.5 µm, or 0.1-0.5 µm, as measured according to ISO 4287/1997.

In one embodiment, both the first outer surface and the second outer surface that faces the second non-conductive transparent base film are provided with a surface roughness of above 0-1.0 µm, or 0.01-10 µm, or 0.1-1.0 µm as measured according to ISO 4287/1997. In one embodiment, both the first outer surface and the second outer surface that faces the second non-conductive transparent base film are provided with a surface roughness of above 0-0.5 µm, or 0.01-0.5 µm, or 0.1-0.5 µm, as measured according to ISO 4287/1997.

In one embodiment, one of the first main surface and the second main surface faces one of the first outer surface and the second outer surface, and the difference between the surface roughness of the one of the first main surface and the second main surface, and the surface roughness of the one of the first outer surface and the second outer surface, that face each other is at least 0.5 µm, or at least 0.7 µm, or at least 1.0 µm, or at least 5.0 µm.

In one embodiment, at least one of the first main surface and the second main surface faces at least one of the first outer surface and the second outer surface, and the difference between the surface roughness of the one of the first main surface and the second main surface, and the surface roughness of the one of the first outer surface and the second outer surface, that face each other is at least 0.5 µm, or at least 0.7 µm, or at least 1.0 µm, or at least 5.0 µm.

In one embodiment, the difference between the surface roughness of the one of the first main surface and the second main surface, and the surface roughness of the one of the first outer surface and the second outer surface, that face each other is at least 0.5 µm, or at least 0.7 µm, or at least 1.0 µm, or at least 5.0 µm.

The outer surfaces of a structure comprising a transparent layer comprising transparent conductor material on a first non-conductive transparent base film are often glossy or smooth. Thus, laminating together two such structures usually requires the use of an adhesive layer between the structures to achieve a good bonding strength. The inventors surprisingly found out that by providing the one of the surfaces of the second non-conductive transparent based film that is to face the structure with a predetermined surface roughness, a good optical and visual quality of the laminated film can be achieved as well as a good bonding strength between the at least one structure, having a smooth outer surface facing the second non-conductive transparent base film, and the second non-conductive transparent base film could be formed without the use of an adhesive layer there between. Being able to simplify the production process by the lack of using especially an optically clear adhesive (OCA) has the added utility of saving production costs as the optically clear adhesives typically used are rather expensive. Further, also problems arising from the use of an adhesive, such as formation of flow marks during further processing may be avoided while the bonding of the laminated structure or film is remained on a sufficient level.

The inventors further found out that the use of a rougher surface of the second non-conductive transparent base film that faces the structure having a smooth or glossy surface has the added utility of allowing air situated between the different layers to escape the from the layered film preform. This has the added utility of enabling to achieve a good bonding strength without the use of an adhesive.

In one embodiment, the at least one structure and the second non-conductive transparent base film are arranged one on the other such that the transparent layer comprising transparent conductor material of the structure faces the second non-conductive transparent base film.

In one embodiment, the at least one structure and the second non-conductive transparent base film are arranged one on the other such that the first non-conductive transparent base film of the structure faces the second non-conductive transparent base film.

In one embodiment, the method comprises providing at least two of said structures and arranging a second non-conductive transparent base film between the at least two structures. In one embodiment, wherein a second non-conductive transparent base film is arranged between two structures, one on the first main surface of the second non-conductive transparent base film and the other on the second main surface of the second non-conductive transparent base film, both the first main surface and the second main surface have a surface roughness of 1.1-20 µm, or 2-17 µm. By providing the surface of the second non-conductive transparent base film with such a surface roughness, a sufficient bonding strength between the structures and the second non-conductive transparent base film can be achieved for the formed laminated film.

In one embodiment, the method comprises providing a multiple of said structures and a multiple of the second non-conductive transparent base films and arranging them one on the other such that between each two structures, a second non-conductive transparent base film is provided.

In one embodiment, one of the first main surface and the second main surface faces the at least one structure and the other of the first main surface and the second main surface is provided with a transparent layer comprising transparent conductor material.

In one embodiment, the one of the first main surface and the second main surface that faces the at least one structure is provided with a transparent layer comprising transparent conductor material. In such an embodiment, the surface of the transparent layer comprising transparent conductor material may have the surface roughness of 1.1-20 µm, or 2-17 µm as measured according to ISO 4287/1997.

In one embodiment, applying heat comprises keeping the layered film preform at a temperature of 50-300° C., or at a temperature of 150-200° C., or at a temperature of 170-190° C.

In one embodiment, applying pressure comprises pressing the layered film preform between lamination plates. In one embodiment, applying pressure comprises keeping the layered film preform under a pressure of 100-750 N/cm², or under a pressure of 130-500 N/cm², or under a pressure of 150-200 N/cm².

In one embodiment, the predetermined period of time is 1-60 minutes, or 5-30 minutes, or 8-20 minutes.

In one embodiment, applying heat and pressure on the layered film preform is carried out in vacuum. In one embodiment, applying heat and pressure on the layered film preform is carried out in vacuum of 0-1 bar.

In one embodiment, the method comprises allowing the layered film preform to cool down to room temperature under pressure after having applied heat and pressure thereon for the predetermined period of time. In one embodiment, the method comprises allowing the layered film preform to cool down to room temperature under a pressure of 100-1000 N/cm², or of 300-600 N/cm², or of 400-500 N/cm², after having applied heat and pressure thereon for the predetermined period of time.

In one embodiment, the first non-conductive transparent base film and/or the second non-conductive transparent base film are/is made of dielectric material. In one embodiment, all of the non-conductive transparent base films of the laminated film are made of dielectric material. In one embodiment, the material used to form the transparent base film should be suitable for serving as a substrate for the transparent layer comprising transparent conductor material.

In one embodiment, the first non-conductive transparent base film and the second non-conductive transparent base film are made of the same material. In one embodiment, the first non-conductive transparent base film and the second non-conductive transparent base film are made of different materials.

In one embodiment, the non-conductive transparent base film is formed of transparent plastic material. In one embodiment, the non-conductive transparent base film comprises or consists of polymer. In one embodiment, the first non-conductive transparent base film and/or the second non-conductive transparent base film comprise(s) or consist(s) of polymer. In one embodiment, the material of the non-conductive transparent base film is selected from a group consisting of polyethylene terephthalate (PET), polycarbonate (PC), polymethyl methacrylate (PMMA), cyclic olefin copolymer (COP), triacetate (TAC), cyclic Olefin Copolymer (COC), poly(vinyl chloride) (PVC), poly(ethylene 2,6-naphthalate (PEN), polyimide (PI), polypropylene (PP), polyethylene (PE), and any combination thereof. The material of the transparent base film is not, however, limited to these examples.

In one embodiment, a non-conductive transparent base film has a thickness of 1-5000 µm, or 10-2000 µm, or 30 to 500 µm, or 50-300 µm. However, the transparent base film may also be thicker in some applications. In one embodiment, the first non-conductive transparent base film and the second non-conductive transparent base film have the same thickness. In one embodiment, the first non-conductive transparent base film and the second non-conductive transparent base film have different thicknesses.

In one embodiment, no adhesive is used to bond together the at least one structure and the second non-conductive transparent base film.

In one embodiment, the method comprises, before arranging the at least one structure and the second non-conductive transparent base film one on the other, providing adhesion promoter on at least the one of the first main surface and the second main surface, which is to face the at least one structure. In one embodiment, the adhesion promoter is selected from a group consisting of acrylic adhesive, silicon adhesive, polymer adhesive, a crosslinking polymer, epoxy adhesive, and any combination thereof.

The transparent conductor material may comprise any appropriate, sufficiently transparent conductor material or any combination of such materials.

In one embodiment, the transparent conductor material comprises or consists of a conductive high aspect ratio molecular structure (HARMS) network. In one embodiment, the transparent conductor material comprises a conductive high aspect ratio molecular structure (HARMS) network.

A conductive "HARMS" or a "HARM structure" refers to electrically conductive "nanostructures", i.e. structures with one or more characteristic dimensions in nanometer scale, i.e. less or equal than about 100 nanometers. "High aspect ratio" refers to dimensions of the conductive structures in two perpendicular directions being in significantly different magnitudes of order. For example, a nanostructure may have a length which is tens or hundreds times higher than its thickness and/or width. In a HARMS network, a great number of said nanostructures are interconnected with each other to form a network of electrically interconnected molecules. As considered at a macroscopic scale, a HARMS network forms a solid, monolithic material in which the individual molecular structures are disoriented or non-oriented, i.e. are oriented substantially randomly, or oriented. Various types of HARMS networks can be produced in the form of thin transparent layers with reasonable resistivity.

In one embodiment, the conductive HARM structures comprise metal nanowires, such as silver nanowires.

In one embodiment, the conductive HARM network comprises carbon nanostructures. In one embodiment, the carbon nanostructures comprise carbon nanotubes, carbon nanobuds, carbon nanoribbons, or any combination thereof. In one embodiment, the carbon nanostructures comprise carbon nanobuds, i.e. carbon nanobud molecules. The carbon nanobuds or the carbon nanobud molecules, have fullerene or fullerene-like molecules covalently bonded to the side of a tubular carbon molecule. Carbon nanostructures, especially carbon nanobuds, may provide advantageous both from electrical, optical (transparency), and mechanical (robustness combined with flexibility and/or deformability) points of view.

In one embodiment, the transparent conductor material comprises or consists of a transparent conductive oxide. In one embodiment, the transparent conductor material comprises or consists of indium tin oxide (ITO), zinc oxide, aluminium-doped zinc oxide (AZO), fluorine doped tin oxide (FTO), or any combination thereof. In one embodiment, the transparent conductor material comprises a transparent conductive oxide. In one embodiment, the transparent conductive oxide is indium tin oxide (ITO), zinc oxide, aluminium-doped zinc oxide (AZO), fluorine doped tin oxide (FTO), or any combination thereof. In one embodiment, the transparent conductive oxide is doped with a doping agent, such as fluorine.

In one embodiment, the transparent conductor material comprises or consists of graphene, silver nanowires, poly (3,4-ethylenedioxythiophene) PEDOT, poly(3,4-ethylenedioxythiophene) polystyrene sulfonate PEDOT:PSS, polyaniline, a metal mesh conductor, or any combination thereof. In one embodiment, the transparent conductor material comprises graphene, silver nanowires, poly(3,4-ethylenedioxythiophene) PEDOT, poly(3,4-ethylenedioxythiophene) polystyrene sulfonate PEDOT:PSS, polyaniline, a metal mesh conductor, or any combination thereof.

The thickness of each of the transparent layers comprising transparent conductor material may be designed in accordance with the properties of the transparent conductive material, especially the resistivity or conductivity thereof. For example, in the case of the transparent conductor material comprising carbon nanostructures, the transparent layer may have, for example, a thickness of 1-1000 nm. In one embodiment, the thickness of the transparent layer comprising transparent conductor material is 0.1-1000 nm, or 10-100 nm, or 100-500 nm.

In one embodiment, the method comprises providing a non-conductive transparent base film. In one embodiment, the method comprises providing a first non-conductive transparent base film and/or a second non-conductive transparent base film. In one embodiment, the method comprises providing a first non-conductive transparent base film. In one embodiment, the method comprises providing a second non-conductive transparent base film. In one embodiment, providing a non-conductive transparent base film comprises making available, a complete transparent base film formed and manufactured beforehand. Such transparent base film may be first prepared, by any appropriate process, for the use thereof in the method for producing the laminated film. In one embodiment, providing a non-conductive transparent base film comprises manufacturing the non-conductive transparent base film as a part of the method for producing the laminated film.

In one embodiment, providing the second non-conductive transparent base film comprises providing at least one of the first main surface and the second main surface with a surface roughness of 1.1-20 µm, or 2-17 µm as measured according to ISO 4287/1997. In one embodiment, providing the second non-conductive transparent base film comprises providing both of the first main surface and the second main surface with a surface roughness of 1.1-20 µm, or 2-17 µm as measured according to ISO 4287/1997. The surface roughness may be provided by any suitable procedure existing in the art.

In one embodiment, providing at least one structure comprising a transparent layer comprising transparent conductor material on a first non-conductive transparent base film comprises forming or depositing transparent conductor material on the non-conductive transparent base film. In one embodiment, transparent conductor material is formed or deposited on at least one side or surface of the first non-conductive transparent base film. In one embodiment, transparent conductor material is formed or deposited on both sides of the first non-conductive transparent base film.

Depending on the material of the transparent layer comprising transparent conductor material, various procedures existing in the art may be used for providing the transparent layer. For example, ITO may be deposited by sputtering in vacuum conditions. PEDOT or silver nanowires may be formed, for example, by printing. Metal meshes may be formed, for example, by printing or electroplating or by any other appropriate method.

In the case of the transparent conductor material comprising carbon nanostructures, such as carbon nanobud molecules, deposition may be carried out, for example, by using the commonly known methods of filtration from gas phase or from liquid, deposition in a force field, or deposition from a solution using spray coating or spin drying. The carbon nanobud molecules can be synthesized, for example, using the method disclosed in WO 2007/057501, and deposited on a transparent base film, for example, directly from the aerosol flow, e.g. by assistance of e.g. electrophoresis or thermophoresis, or by a method described in Nasibulin et al: "Multifunctional Free-Standing Single-Walled 20 Carbon Nanotube Films", ACS NANO, vol. 5, no. 4, 3214-3221, 2011.

In one embodiment, transparent conductor material is deposited on the first non-conductive transparent base film and/or on the second non-conductive transparent base film. In one embodiment, the transparent conductor material is deposited in a predetermined pattern on the first non-conductive transparent base film and/or on the second non-conductive transparent base film. In one embodiment, a predetermined pattern is formed in the transparent layer after having deposited the transparent conductor material on the first non-conductive transparent base film and/or on the second non-conductive transparent base film. In said patterning, various processes may be used. In one embodiment, a laser process, an etching process, direct printing, a mechanical process, a burning process, or any combination thereof, is used for the patterning. In one embodiment, the laser process is laser ablation. In one embodiment, the etching process is a photolithographic process. In one embodiment, the pattern is formed simultaneously or after the transparent layer is formed by depositing transparent conductor material on the first transparent base film and/or on the second non-conductive transparent base film.

In one embodiment, at least one metallic contact pad is provided on the transparent layer comprising transparent conductor material. In one embodiment, the at least one metallic contact pad is provided by using screen printing or ink-jet printing. In one embodiment, the at least one metallic contact pad comprises silver, gold, copper or any combination thereof.

In one embodiment, the at least one structure and/or the second non-conductive transparent base film comprise(s) at least one additional component attached thereto. In one embodiment, the at least one structure comprises at least one additional component attached thereto. In one embodiment, the second non-conductive transparent base film comprises at least one additional component attached thereto. In one embodiment, the additional component is essentially transparent. In one embodiment, the additional component is essentially non-transparent. In one embodiment, the additional component is selected from a group consisting of a silicon chip, a piezo vibrator, a force sensor, a light emitting diode (LED), and a light guide. In one embodiment, the at least one structure and/or the second non-conductive transparent base film are/is provided with at least one additional component attached thereto, wherein the additional component is selected from a group consisting of a silicon chip, a piezo vibrator, a force sensor, a light emitting diode (LED), and a light guide.

In one embodiment, the method comprises providing at least one additional layer on the laminated film. In one embodiment, the laminated film comprises or is provided with at least one additional layer. In one embodiment, at least one of the at least one additional layers is essentially transparent. In one embodiment, at least one of the at least one additional layers is essentially non-transparent. In one embodiment, at least one of the at least one additional layers is a decorative layer. The decorative layer may for example be used to form a pattern on the laminated transparent film e.g. to provide location information for touch. In one embodiment, a protecting layer is provided on the laminated film. The additional layer may comprise base or cover plates. Any of the base and cover plates may comprise a transparent plastic material, such as acrylate or PC or a multilayer laminate of these, or a glass material, such as a float glass (comprising of $SiO_2$, $Na_2O$, CaO, MgO), sodalime, or aluminosilicate or borosilicate glass, or a laminate consisting of such glass and/or plastic materials. A typical automotive safety glass may comprise two float glass sheets with a plastic e.g. polyvinyl butyral (PVB) embedded in-between.

In one embodiment, the method comprises subjecting the laminated film to injection molding and/or thermoforming. In one embodiment, the method comprises, after having applied heat and pressure on the layered film preform for a predetermined period of time, subjecting the laminated film to injection molding and/or thermoforming. In one embodiment, the method comprises, after having allowed the layered film preform to cool down to room temperature under pressure, subjecting the laminated film to injection molding and/or thermoforming. In one embodiment, the laminated film is formed to have a three-dimensional shape. In one embodiment, the laminated film has been subjected to thermoforming and/or injection molding.

In one embodiment, the laminated film is formed as a flexible structure so as to allow bending thereof, preferably reversibly and repeatedly, along a three dimensional surface in at least one direction. In one embodiment, the laminated transparent film is bendable in at least one direction. In one embodiment, the laminated film is bendable in at least two directions simultaneously. Depending on the material used for producing the laminated film, the smallest radius of curvature in which the laminated film may be bent may lie, for example, in the range of 0.5 mm to 3 or 10 mm. In one embodiment, the radius of curvature in which the laminated film may be bent lies in the range of 0.5 mm to 3 or 10 mm. The smallest radius of curvature may be achieved for transparent layers comprising carbon nanostructures such as carbon nanobuds, whereas for other materials, the lowest possible radius of curvature may be higher.

In one embodiment, the laminated film is formed as a deformable structure so as to allow deforming of the laminated film along a three dimensional surface. Said deforming may be based on, for example, stretchability of the laminated film, and may be carried out, for example, by using thermoforming. Flexibility and/or deformability may have the added utility of enabling use of the laminated film as a curved, or generally three dimensionally shaped structure, such as a dome shaped structure.

It will be understood that the benefits and advantages described above may relate to one embodiment or may relate to several embodiments. The embodiments are not limited to those that solve any or all of the stated problems or those that have any or all of the stated benefits and advantages.

The embodiments described hereinbefore may be used in any combination with each other. Several of the embodiments may be combined together to form a further embodiment. A method, a laminated film, a use, or a touch sensitive film, to which the application is related, may comprise at least one of the embodiments described hereinbefore.

The method for producing the laminated film has the added utility of enabling the production of the laminated film without the use of an adhesive while a good bonding strength between the distinct layers of the formed film is remained. Taking that the adhesive used in the production process should beneficially be an optically clear adhesive that are generally rather expensive, being able to leave out the use of the adhesive affects the productions costs in an advantageous manner. Also the productions steps are simplified and the operating process window is broadened as the use of an additional material is not required.

The method for producing the laminated film has the added utility of enabling the use of one and the same material, e.g. the same polymer having the same refractive index, for both the first non-conductive transparent base film and the second non-conductive transparent base film, which is advantageous for the index matching.

EXAMPLES

Reference will now be made in detail to the described embodiments, examples of which are illustrated in the accompanying drawings.

The description below discloses some embodiments in such a detail that a person skilled in the art is able to utilize the method and the laminated film based on the disclosure. Not all steps of the embodiments are discussed in detail, as many of the steps will be obvious for the person skilled in the art based on this specification.

For reasons of simplicity, item numbers will be maintained in the following exemplary embodiments in the case of repeating components.

Figure 1:
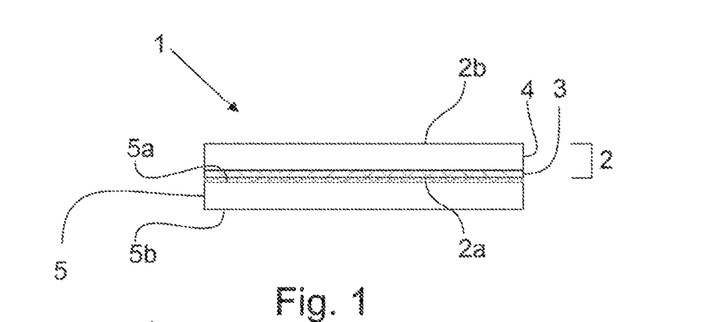
FIG. 1 illustrates schematically a sectional view of a laminated film according to one embodiment.

FIG. 1 illustrates schematically a sectional view of a laminated film 1 produced according to one embodiment described in this description. From FIG. 1 one can see a structure 2 comprising a transparent layer comprising transparent conductor material 3 on a first non-conductive transparent base film 4. The structure has a first outer surface 2a and a second outer surface 2b, which is opposite to the first outer surface 2a. The first outer surface and the second outer surface of the structure are smooth. The structure 2 is arranged on a second non-conductive transparent base film 5. The second non-conductive transparent base film 5 has a first main surface 5a and a second main surface 5b. In the embodiment of FIG. 1, the first main surface 5a is illustrated as having a surface roughness of 1.1-20 µm when measured according to ISO 4287/1997. The first main surface 5a having the above surface roughness faces the structure 2 and especially the transparent layer comprising transparent conductor material 3, thereof.

Figure 2:
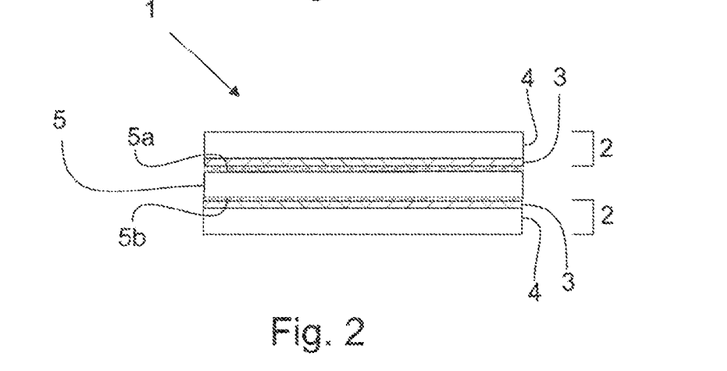
FIG. 2 illustrates schematically a sectional view of a laminated film according to one embodiment.

FIG. 2 illustrates schematically a sectional view of a laminated film 1 produced according to one embodiment described in this description. From FIG. 2 one can see that two distinct structures 2, which both comprise a transparent layer comprising transparent conductor material 3 on a first non-conductive transparent base film 4, are formed. These two structures 2 and the second non-conductive transparent base film 5 are arranged one on the other such that the second non-conductive transparent base film 5 lies between the two structures 2. In the embodiment illustrated in FIG. 2, both the first main surface 5a and the second main surface 5b are illustrated to have a surface roughness of 1.1-20 µm when measured according to ISO 4287/1997.

The first main surface 5a and the second main surface 5b having the above surface roughness, each face one of the two structures 2 and especially the transparent layers comprising transparent conductor material 3, thereof.

Both the formed structure and/or the second transparent base film may comprise additional components thereon or attached thereto as will be clear to the skilled person even though these additional components are not illustrated in the accompanying figures.

Example 1-Producing a Laminated Film

In this example laminated films were produced by the following procedure:

Firstly, two separate structures, each comprising a transparent layer comprising transparent conductor material on a first non-conductive transparent base film, were provided. The first non-conductive transparent base film was a polycarbonate (PC) film on which a transparent layer comprising transparent conductor material was formed. In this example the transparent conductor material comprised carbon nanobud molecules.

Carbon nanobud molecules can be synthesized from, for instance, a carbon source e.g. carbon monoxide using catalyst precursors such as ferrocene, or catalysts generated from a hot wire generator, such as metal particles and additional agents which, in addition to promoting the growth of nanobud molecules, increase the purity of the product. Details of the synthesis process can be found in publication WO 2007/057501 A1.

The carbon nanobud molecules were deposited on the polycarbonate film to form a transparent layer comprising transparent conductor material thereon. If desired, a primer layer may be formed on the deposited carbon nanobud molecules to improve the adhesion of the carbon nanobud molecules. Thereafter, contact pads of silver were printed by screen printing on the transparent layer comprising carbon nanostructures, i.e. in this example, carbon nanobuds. The formed structures were then pretreated by baking for about 15 minutes at 110° C., followed by subjecting to overcoat printing and further baking for about 20 minutes at 90° C.

The outer surfaces of the formed structures were smooth showing a surface roughness of about 0.5 µm as measured according to ISO 4287/1997.

Thereafter, a second non-conductive transparent base film of polycarbonate was provided. The first main surface of the second non-conductive transparent base film was provided with a surface roughness of about 8 and the second main surface of the second non-conductive transparent base film was provided with a surface roughness of about 14 µm as measured according to ISO 4287/1997. The formed structures and the second non-conductive transparent base film were then arranged the one on the other such that the second non-conductive transparent base film was situated between the two structures.

The thus formed layered film preform was then put between two metal lamination plates and put into a lamination machine, where heat and pressure was applied for a predetermined time for bonding together the structures and the second non-conductive transparent base film. After a predetermined time the layered film preform was allowed to cool to room temperature while being kept under pressure to finalize the lamination thereof.

The above procedure was repeated to form otherwise similar stacks but by varying the applied process parameters during the lamination as presented below in Table 1.

A reference example was also prepared by producing similar kinds of structures as above presented, i.e. a layer of carbon nanobuds was deposited on a polycarbonate film. These two structures were then bonded together by using an optically clear adhesive during the lamination process.

TABLE 1

Used process parameters during the lamination process

| | Reference example | Example 1 | Example 2 |
|---|---|---|---|
| Heating time (min) | 8 | 12 | 8 |
| Heating temperature (° C.) | 185 | 185 | 185 |
| Pressure during heating (N/cm$^2$) | 200 | 100 | 100 |
| Cooling time (min) | 4 | 10 | 4 |
| Pressure during cooling (N/cm$^2$) | 750 | 500 | 500 |
| Transmittance (%) | 78.33 | 78.52 | 77.60 |
| Haze (%) | 0.7 | 1.3 | 1.7 |

The transmittance was measured according to standard JIS-K7361, ASTM D1003 and the haze was measured according to standard K7136, ASTM D1003.

Based on the received test results it could be seen that with the used method a visually and optically suitable laminated film with a good bonding strength could be formed. No delamination was noticed. Further, the transmittance and the haze were also sufficiently good as can be seen from Table 1 for examples 1-3 as compared to the reference example.

It is to be noted that the embodiments of the claims are not limited to those discussed above, but further embodiments may exist within the scope of the claims.

The invention claimed is:

1. A method for producing a laminated film (1), wherein the method comprises:
providing at least one structure (2) comprising a transparent layer having transparent conductor material (3) on a first non-conductive transparent base film (4), the at least one structure (2) having two outer surfaces (2a, 2b) with a first outer surface (2a) which is opposite to a second outer surface (2b), and having at least one of the two outer surfaces (2a, 2b) with a surface roughness of above 0 and up to 1.0 µm as measured according to ISO 4287/1997;
providing a second non-conductive transparent base film (5) having two main surfaces (5a, 5b) with a first main surface (5a) which is opposite to a second main surface (5b), and having at least one of two main surfaces (5a, 5b) with a corresponding surface roughness of 1.1-20 µm as measured according to ISO 4287/1997;
arranging the at least one structure (2) and the second non-conductive transparent base film (5) on each other to form a layered film preform having the at least one outer surface (2a, 2b) with the surface roughness facing the at least one main surface (5a, 5b) with the corresponding surface roughness; and
after forming the layered film preform, applying heat and pressure on the layered film preform for a predetermined period of time to bond together the at least one main surface (5a, 5b) to produce the laminated film.

2. The method of claim 1, wherein the difference between the surface roughness and the corresponding surface roughness is at least 0.5 µm, or at least 0.7 µm, or at least 1.0 µm, or at least 5.0 µm.

3. The method of claim 1, wherein the surface roughness is between 2-17 µm, or 5-17 µm, or 11-17 µm, or 9-15 µm, or 10-14 µm, as measured according to ISO 4287/1997.

4. The method of claim 1, wherein the corresponding surface roughness is between 1.1-20 pm, or 2-17 pm, or 5-17 pm, or 11-17 pm, or 9-15 pm, or 10-14 pm, as measured according to ISO 4287/1997.

5. The method of claim 1, wherein the method comprises arranging the at least one structure (2) and the second non-conductive transparent base film (5) on each other such that the transparent layer faces the second non-conductive transparent base film (5).

6. A method of claim 1, wherein the method comprises providing at least two structures (2) and arranging the second non-conductive transparent base film (5) between the at least two structures (2).

7. A method of claim 1, wherein the method comprises configuring each of the first main surface (5a) and the second main surface (5b) with a respective transparent layer comprising respective transparent conductor material (3).

8. The method of claim 1, wherein the step of applying heat and pressure on the layered film preform comprises keeping the layered film preform at a temperature of 50-300° C., or at a temperature of 150-200° C., or at a temperature of 170-190° C.

9. The method of claim 1, wherein the step of applying heat and pressure on the layered film preform comprises keeping the layered film preform under a pressure of 100-750 N/cm$^2$, or under a pressure of 130-500 N/cm$^2$, or under a pressure of 150-200 N/cm$^2$.

10. The method of claim 1, wherein the predetermined period of time is 1-60 minutes, or 5-30 minutes, or 8-20 minutes.

11. The method of claim 1, wherein the method comprises carrying out the step of applying heat and pressure on the layered film preform in a vacuum.

12. The method of claim 1, wherein the method comprises allowing the layered film preform to cool down to room temperature under a cooling pressure after the step of applying heat and pressure on the layered film preform for the predetermined period of time.

13. The method of claim 1, wherein no adhesive is used to bond together the at least one structure (2) and the second non-conductive transparent base film (5).

14. The method of claim 1, wherein the method comprises, before arranging the at least one structure (2) and the second non-conductive transparent base film (5) one on the other, providing an adhesion promoter on at least the one of the first main surface (5a) and the second main surface (5b), which is to face the at least one structure.

15. The method of claim 1, wherein the transparent conductor material comprises a conductive high aspect ratio molecular structure (HARMS) network.

16. The method of claim 1, wherein the transparent conductor material comprise a transparent conductive oxide.

17. The method of claim 1, wherein the transparent conductor material comprises a material selected from the group consisting of graphene, silver nanowires, poly(3,4-ethylenedioxythiophene) PEDOT, poly(3,4-ethylenedioxythiophene) polystyrene sulfonate PEDOT:PSS, polyaniline, or a metal mesh conductor.

18. The method of claim 1, wherein either the first non-conductive transparent base film (4), or the second non-conductive transparent base film (5), or both the first non-conductive transparent base film (4) and the second non-conductive transparent base film (5) comprises a polymer.

19. The method of claim 1, wherein the method comprises attaching at least one additional component to the at least one structure (2) and/or the second non-conductive transparent base film (5a), and selecting the at least one additional component from a group consisting of a silicon chip, a piezo vibrator, a force sensor, a light emitting diode (LED), and a light guide.

* * * * *